(12) United States Patent
Shimizu et al.

(10) Patent No.: US 8,532,140 B2
(45) Date of Patent: Sep. 10, 2013

(54) WIRELESS COMMUNICATION METHOD, WIRELESS COMMUNICATION SYSTEM, BASE STATION, AND TERMINAL STATION

(75) Inventors: Yoshitaka Shimizu, Yokosuka (JP); Fusao Nuno, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 306 days.

(21) Appl. No.: 12/920,488

(22) PCT Filed: Mar. 12, 2009

(86) PCT No.: PCT/JP2009/054786
§ 371 (c)(1),
(2), (4) Date: Sep. 1, 2010

(87) PCT Pub. No.: WO2009/113623
PCT Pub. Date: Sep. 17, 2009

(65) Prior Publication Data
US 2011/0013578 A1  Jan. 20, 2011

(30) Foreign Application Priority Data

Mar. 12, 2008 (JP) ................. 2008-062531

(51) Int. Cl.
*H04J 3/16* (2006.01)
(52) U.S. Cl.
USPC ........ 370/468; 370/230; 370/232; 370/230.1; 370/235; 370/248; 370/252; 370/253; 370/329; 370/442; 370/470; 370/458; 370/280; 370/294; 370/321; 455/9; 455/515

(58) Field of Classification Search
USPC .............. 370/468, 330, 230, 232, 230.1, 235, 370/248, 252, 253, 442, 470, 538, 458, 280, 370/294, 321, 329; 455/9, 515
See application file for complete search history.

(56) References Cited

U.S. PATENT DOCUMENTS 5,570,355 A * 10/1996 Dail et al. ..................... 370/352
5,862,452 A * 1/1999 Cudak et al. .................... 725/81
(Continued)

FOREIGN PATENT DOCUMENTS

| CN | 1929338 A | 3/2007 |
|---|---|---|
| JP | 10-173584 A | 6/1998 |

(Continued)

OTHER PUBLICATIONS

"Development of an Advanced Wireless Access System in the 5GHz Band -MAC/DLC Functions-" 2000 IEICE Society Conference B-5-39, p. 327, with partial English translation thereof.

(Continued)

*Primary Examiner* — Ian N Moore
*Assistant Examiner* — Phong La
(74) *Attorney, Agent, or Firm* — Harness, Dickey & Pierce, P.L.C.

(57) ABSTRACT

A base station performs bandwidth assignment for each terminal station or each wireless link even when the base station does not receive a bandwidth request in random access from the terminal station in the demand assignment period present in a specific period in which a transmission frequency of data to transmit is high, the specific period being specified for each terminal station or each wireless link between the terminal station and the base station, and the terminal station transmits at least one of bandwidth request information and the data to transmit in a bandwidth assigned by the base station.

8 Claims, 10 Drawing Sheets

(56) References Cited

U.S. PATENT DOCUMENTS

| | | | |
|---|---|---|---|
| 5,960,000 A * | 9/1999 | Ruszczyk et al. | 370/447 |
| 6,411,808 B1 * | 6/2002 | Adachi et al. | 455/434 |
| 7,260,116 B2 * | 8/2007 | Ota et al. | 370/477 |
| 7,406,342 B2 * | 7/2008 | Kim | 455/574 |
| 7,489,646 B2 * | 2/2009 | Sung et al. | 370/280 |
| 7,509,150 B1 * | 3/2009 | Simmons | 455/574 |
| 7,653,532 B2 * | 1/2010 | Nakano | 704/201 |
| 7,672,230 B2 * | 3/2010 | Chapman et al. | 370/225 |
| 7,957,759 B2 * | 6/2011 | Papasakellariou | 455/522 |
| 8,233,462 B2 * | 7/2012 | Walton et al. | 370/338 |
| 8,335,179 B2 * | 12/2012 | Hayashino et al. | 370/321 |
| 2001/0016496 A1 * | 8/2001 | Lee | 455/450 |
| 2003/0137993 A1 * | 7/2003 | Odman | 370/468 |
| 2005/0152397 A1 * | 7/2005 | Bai et al. | 370/468 |
| 2007/0058605 A1 * | 3/2007 | Meylan et al. | 370/346 |
| 2007/0195817 A1 * | 8/2007 | Denney et al. | 370/468 |
| 2008/0165733 A1 * | 7/2008 | Xiao et al. | 370/330 |
| 2008/0165746 A1 * | 7/2008 | Sung et al. | 370/337 |
| 2008/0175265 A1 * | 7/2008 | Yonge et al. | 370/447 |
| 2010/0226326 A1 * | 9/2010 | Ahn et al. | 370/329 |
| 2012/0188973 A1 * | 7/2012 | Meylan et al. | 370/329 |

FOREIGN PATENT DOCUMENTS

| | | | |
|---|---|---|---|
| JP | 2007-329723 | * | 12/2007 |
| JP | 2007-329723 A | | 12/2007 |

OTHER PUBLICATIONS

Office Action, Chinese Patent Application No. 200980107262.5, Nov. 22, 2012.

* cited by examiner

WIRELESS COMMUNICATION METHOD, WIRELESS COMMUNICATION SYSTEM, BASE STATION, AND TERMINAL STATION

CROSS-REFERENCE TO RELATED APPLICATIONS

This application is a 371 U.S. National Stage of International Application No. PCT/JP2009/054786, filed Mar. 12, 2009. This application claims the benefit of Japanese Patent Application No. 2008-062531, filed Mar. 12, 2008. The disclosures of the above applications are incorporated herein by reference.

TECHNICAL FIELD

The present invention relates to a wireless communication method, a wireless communication system, a base station, and a terminal station capable of dynamic bandwidth assignment.

This application claims priority on and the benefit from Japanese Patent Applications No. 2008-062531 filed on Mar. 12, 2008, the disclosure of which is incorporated herein by reference.

BACKGROUND ART

In recent years, ubiquitous networks using wireless local and personal areas communication system such as wireless tags, Bluetooth (registered trademark), and ZigBee (registered trademark) have begun to be widely used in the fields of equipment control, traffic, distribution, environmental protection, food industry, agriculture, earthquake monitoring, health care and so on. With the development of applications or services, the number of users of the networks is expected to increase in the future. Here, a global ubiquitous network that allows several applications or services to be provided to a greater number of users and enlarges the service area has attracted considerable attention.

The network shown in FIG. 1 includes a base station 2 connected to a wired network 1, and a number of wireless terminals 3-1, 3-2 to 3-N (N is an integer) scattered over a wide area. The wireless terminals 3-1, 3-2 to 3-N are directly accommodated in the base station 2. In FIG. 1, the wireless terminals 3-1 and 3-2 establish one wireless link 5 with the base station 2, respectively. Further, the wireless terminal 3-N establishes two wireless links 5 with the base station 2.

Further, a plurality of base stations 2 may be connected to the wired network 1.

The wireless terminals 3-1, 3-2 to 3-N in the present network are driven by a battery. The wireless terminals 3-1, 3-2 to 3-N are low-power and low-performance terminals having only a minimum number of functions such as data measurement and transmission of measured data. Traffic from the wireless terminals 3-1, 3-2 to 3-N is characterized by (1-1) a small amount of data, (1-2) a relatively long transmission interval, and (1-3) high-periodicity for data generation. A number of such wireless terminals 3-1, 3-2 to 3-N are under one base station 2. Accordingly, traffic properties include a great amount of periodicity traffic of UL (data transmission from the wireless terminals 3-1, 3-2 to 3-N to the base station 2 at the side of the wired network 1), and generally increase in the total amount of traffic. Further, in the present network, one base station 2 must efficiently accommodate as many wireless terminals 3-1, 3-2 to 3-N as possible in order to collect as much data as possible from many wireless terminals 3-1, 3-2 to 3-N. Accordingly, such a network needs a media access control (MAC) protocol capable of realizing high throughput and a short transmission delay time while one base station efficiently accommodates a number of low-performance wireless terminals 3-1, 3-2 to 3-N.

Dynamic slot assignment (DSA), which is a centralized control method having high resource utilization efficiency, has been known as a MAC protocol satisfying the above requirement. In this method, the base station 2 dynamically assigns a bandwidth (slot) according to a request from the wireless terminals 3-1, 3-2 to 3-N.

FIG. 2 shows an example of a MAC frame in time division multiple access-time division duplex (TDMA-TDD). The MAC frame has a constant length and is divided into an uplink period and a downlink period. The downlink period consists of a broadcast area (referred to as a period) and a demand assignment area. The uplink period consists of a demand assignment (DA) area and a random access (RA) area.

The demand assignment area is a bandwidth assignment area for each of the wireless terminals 3-1, 3-2 to 3-N or the wireless links, and can be accessed without contention. Meanwhile, the random access area is used by the plurality of wireless terminals 3-1, 3-2 to 3-N using random access and is a contention-based access area. A broadcast control channel (Bch), a random access feedback channel (RFch), a frame control channel (Fch), a control channel (Cch), a data channel (Dch), and a random access channel (Rch) are used to transmit and receive data or control information. Bch is provided for frame synchronization and is used to report attribute information (e.g., a base station identifier (ID)) of the base station 2 to the wireless terminals 3-1, 3-2 to 3-N. Fch is used to notify of information about the bandwidth assignment for each of the wireless terminals 3-1, 3-2 to 3-N or the wireless links (e.g., an ID for specifying the wireless terminals 3-1, 3-2 to 3-N or the wireless links 5 assigned to the bandwidth, an assignment channel, an assignment position, and an assignment amount) in the demand assignment area in which the bandwidth assignment is performed in units of the wireless terminals 3-1, 3-2 to 3-N or the wireless links. RFch is used to notify of random access information (e.g., a random access result of a previous frame, a random access parameter (an initial window size (IWS) and a persistent factor (PF)), a start position of random access in the present frame, and the number of random access slots). Cch is used to transmit and receive control information for each wireless terminal or each wireless link, such as a bandwidth request (resource request, RREQ) or automatic repeat request (ARQ). Dch is used to transmit and receive data. Rch is a channel for random access and is used for wireless terminals 3-1, 3-2 to 3-N or the wireless links to transmit, by random access, RREQ to the base station 2.

In a DSA method, a random access is mainly employed for a wireless terminal to request a bandwidth because it can accommodate aperiodic, bursty data flexibly and efficiently.

FIG. 3 shows an example of an uplink data transmission sequence using such a method. In the present example, the base station 2 sequentially transmits Bch, RFch, and Fch from the beginning of a MAC frame to the wireless terminals 3-1, 3-2 to 3-N.

The wireless terminals 3-1, 3-2 to 3-N under the base station 2 can recognize a start position of the random access in the frame and the number of random access slots by receiving RFch. When the wireless terminals 3-1, 3-2 to 3-N transmit data to the base station 2, the wireless terminals 3-1, 3-2 to 3-N transmit an RREQ (bandwidth request) including an ID for specifying the wireless terminals 3-1, 3-2 to 3-N or the wireless links 5 using Rch in order to request a bandwidth for data to transmit. In this case, the wireless terminals 3-1, 3-2 to 3-N voluntarily determine a back-off time, which is a transmission deferred time, based on an exponential back-off algorithm in order to avoid collision with Rch from other wireless terminals 3-1, 3-2 to 3-N. In the algorithm, a certain random value (integer) ranging from 0 to a window size (WS) is generated. The random value is used as the number of back-off slot. A time taken for the elapse of the number of back-off slot is a back-off time. Further, in first random access, IWS broadcasted using RFch is used as WS.

When the back-off time is completed, the wireless terminals 3-1, 3-2 to 3-N transmit RREQ to the base station 2 using an Rch slot immediately after completion of waiting. If there is a collision with Rch from the other wireless terminals 3-1, 3-2 to 3-N, RREQ is retransmitted by applying an exponential back-off algorithm. When the base station 2 correctly receives RREQ, the base station 2 notifies of successful RREQ reception using RFch of a next frame, and assigns Dch corresponding to a bandwidth request value from RREQ. Further, in the next frame assigned Dch, the base station 2 assigns Cch for ARQ (ARQ-ACK/ARQ-NACK) to transmit a Dch arrival acknowledgement to the wireless terminal 2.

When ARQ-ACK Cch is received, the wireless terminals 3-1, 3-2 to 3-N complete the data transmission process. On the other hand, when ARQ-NACK Cch is received, the wireless terminals 3-1, 3-2 to 3-N retransmit RREQ by applying the exponential back-off algorithm.

In the dynamic slot assignment (DSA) using the random access, particularly, there are a number of wireless terminals 3-1, 3-2 to 3-N under the base station 2. Accordingly, the access to the random access (RA) increases and the RcH (random access channel) is highly likely to collide with another Rch, which increases overhead. The overhead is a transmission deferred time based on the exponential back-off algorithm, which deteriorates throughput and delay properties.

Non-patent Document 1: Ohta Atsushi, Nuno Fusao, Mochizuki Nobuaki, et al., "Development of 5 GHz bandwidth advanced wireless access (AWA) system-MAC/DCL function", 2000 IEICE Society Conference B-5-39, pp. 327.

DISCLOSURE OF INVENTION

Problem to be Solved by the Invention

The invention has been achieved in view of the above circumstances, and it is an object of the present invention to provide a wireless communication method, a wireless communication system, a base station, and a terminal station that can reduce random access traffic, thereby reducing overhead resulting from collision and enhancing a throughput property and a delay property between the base station and a wireless terminal connected with the base station by a wireless line.

Means for Solving the Problem (1) The present invention has been achieved to resolve the foregoing problems. An aspect of the present invention provides a wireless communication method in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, wherein the base station performs bandwidth assignment for each terminal station or each wireless link even when the base station does not receive a bandwidth request in the random access from the terminal station in the demand assignment period present in a specific period in which a frequency of data transmission is high, the specific period being specified for each terminal station or each wireless link between the terminal station and the base station, and the terminal station transmits bandwidth request information or the data to transmit in a bandwidth assigned by the base station.

(2) In the wireless communication method according to an aspect of the present invention, the specific period has at least one of an initiation time and a termination time set based on an indication from the outside of the base station.

(3) In the wireless communication method according to an aspect of the present invention, the specific period has at least one of an initiation time and a termination time set corresponding to a signal exchange sequence for each wireless link.

(4) In the wireless communication method according to an aspect of the present invention, the specific period has an initiation time set corresponding to bandwidth assignment for the terminal station or the wireless link.

(5) In the wireless communication method according to an aspect of the present invention, the specific period has a termination time, the termination time being set in at least one of first, second, and third cases, the first case being that the termination time is set upon timeout of an internal timer set upon the initiation, the second case being that the termination time is set according to an access situation of the bandwidth request or the data to transmit for the bandwidth assigned by the base station for each terminal station or each wireless link, even when the base station does not receive a bandwidth request in the random access from the terminal station in the demand assignment period present in the specific period, the third case being that the termination time is set upon receipt of the bandwidth request in the random access.

(6) In the wireless communication method according to an aspect of the present invention, the specific period has at least one of an initiation time and a termination time estimated and set based on measurement information for data received at the base station for each terminal station or each wireless link.

(7) In the wireless communication method according to an aspect of the present invention, the bandwidth assignment for each terminal station or each wireless link in the demand assignment period present in the specific period is performed at least one of a predefined timing and a timing satisfying a predefined condition.

(8) Another aspect of the present invention provides a wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, wherein the base station performs bandwidth assignment for each terminal station or each wireless link even when the base station does not receive a bandwidth request in the random access from the terminal station in the demand assignment period present in a specific period in which a frequency of data transmission is high, the specific period being specified for each terminal station or each wireless link between the terminal station and the base station, and the terminal station transmits bandwidth request information or the data to transmit in a bandwidth assigned by the base station.

(9) Another aspect of the present invention provides a base station in a wireless communication system in which a plurality of terminal stations are connected to the base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, wherein the base station: performs bandwidth assignment for each terminal station or each wireless link even when the base station does not receive a bandwidth request in random access from the terminal station in the demand assignment period present in a specific period in which a frequency of data transmission is high, the specific period being specified for each terminal station or each wireless link between the terminal station and the base station; and receives at least one of bandwidth request information and the data to transmit transmitted in the assigned bandwidth from the terminal station.

(10) Another aspect of the present invention provides a terminal station in a wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, wherein the terminal station transmits at least one of bandwidth request information and the data to transmit in a bandwidth assigned by the base station for each terminal station or each wireless link even when the terminal station does not transmit a bandwidth request in the random access in the demand assignment period present in a specific period in which a frequency of data transmission is high, the specific period being specified for each terminal station or each wireless link between the terminal station and the base station by the base station.

Effect of the Invention

According to the present invention, the base station specifies a period in which an uplink data transmission frequency is high, for each wireless terminal that is a terminal station or for each wireless link, and assigns an uplink data transmission bandwidth for the wireless terminal or the wireless link to the specified period (specific period). Thus, the base station performs the uplink transmission bandwidth assignment in advance, thereby reducing random access traffic.

REFERENCE SYMBOLS

1: Wired network,
2: Base station,
3-1, 3-2 to 3-N: Wireless terminal,
4: Server,
5: Wireless link,
21: Transmitter,
22: Receiver,
23: Wireless controller,
24: Bandwidth assignment unit,
25: Connection controller,
26: Wireless link monitor,
27: Wireless traffic measurement unit

BEST MODE FOR CARRYING OUT THE INVENTION

Figure 1:
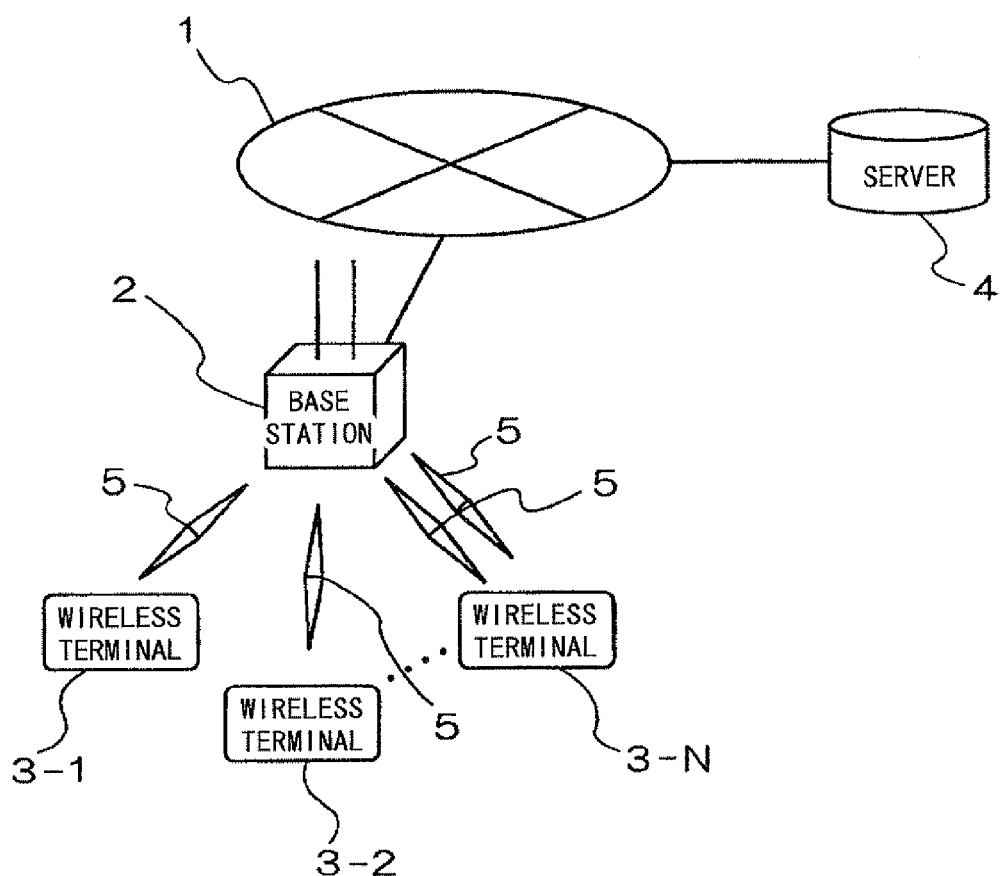
FIG. 1 is a schematic block diagram showing a basic configuration of a wireless communication system in an embodiment of the present invention and a conventional technique.

Hereinafter, respective embodiments of the present invention will be described with reference to the accompanying drawings. A wireless system of an embodiment of the present invention has the same basic configuration as a conventional wireless system. That is, the wireless system includes a base station 2 connected to a wired network 1 and a number of wireless terminals 3-1, 3-2 to 3-N scattered over a wide area, as shown in FIG. 1. The wireless terminals 3-1, 3-2 to 3-N are directly accommodated in the base station 2 as terminal stations. In this case, a server 4 is connected to the wired network 1. Further, the base station 2 is connected to the plurality of wireless terminals 3-1, 3-2 to 3-N by wireless links 5, respectively.

Figure 2:
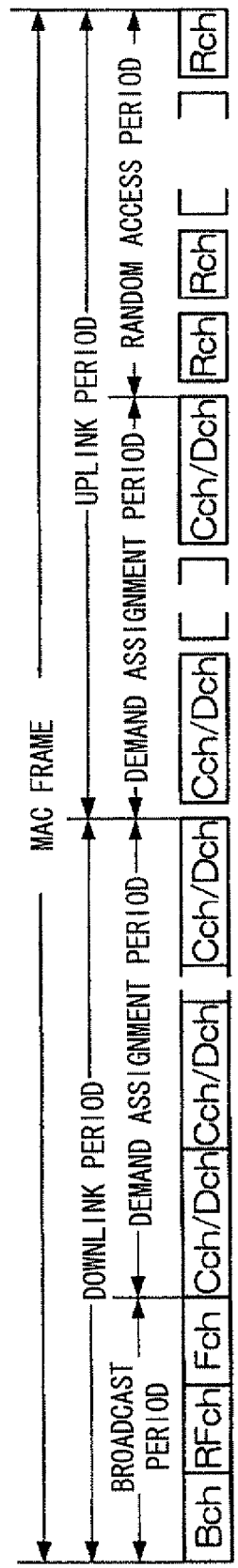
FIG. 2 shows a configuration of a MAC frame.

Hereinafter, the case where a MAC frame in TDMA-TDD shown in FIG. 2 is used when the base station 2 dynamically assigns a bandwidth according to a request from the wireless terminals 3-1, 3-2 to 3-N will be described.

That is, in the wireless system of an embodiment of the present invention, the plurality of wireless terminals 3-1, 3-2 to 3-N are connected with the base station 2 by a time-divisional, common wireless line (consisting of each wireless link 5), as in the conventional wireless system. The base station 2 manages a bandwidth for bandwidth assignment in an uplink communication bandwidth of a MAC frame, which is a wireless frame, as a demand assignment period and manages a remaining bandwidth as a random access period. The base station 2 assigns a requested uplink communication bandwidth to the demand assignment period according to bandwidth request information from the wireless terminals 3-1, 3-2 to 3-N. When data to transmit is generated, the wireless terminals 3-1, 3-2 to 3-N transmit, by random access, the bandwidth request information using a slot in the random access period after a back-off time lapses. When the transmission is not successfully performed, the wireless terminals 3-1, 3-2 to 3-N transmit, by random access, the bandwidth request information again after the back-off time lapses. When the transmission is successfully performed, an uplink communication bandwidth is assigned to the demand assignment period from the base station 2, and the wireless terminals 3-1, 3-2 to 3-N transmit the data to transmit using the assigned bandwidth.

In an embodiment of the present invention, a period in which a transmission frequency of uplink data to transmit is high can be specified, as described below. Further, even when the base station 2 does not receive a bandwidth request through random access from the wireless terminals 3-1, 3-2 to 3-N, the base station 2 performs dynamic bandwidth assignment for the wireless terminals 3-1, 3-2 to 3-N or the wireless links 5 to transmit the uplink data in an uplink demand assignment period in the specified period.

For bandwidth assignment, the base station 2 of the wireless system in an embodiment of the present invention specifies a period in which a transmission frequency of uplink data to transmit is high, as a "specific period," for each of the wireless terminals 3-1, 3-2 to 3-N or for each wireless link 5. The base station 2 assigns an uplink data transmission bandwidth for the wireless terminals 3-1, 3-2 to 3-N or the wireless links 5 to the specific period. Accordingly, it is unnecessary for the wireless terminals 3-1, 3-2 to 3-N to transmit RREQ (bandwidth request) using random access, which leads to the reduction of a random access traffic amount. The specific period is a time corresponding to one or a plurality of MAC frames in FIG. 2.

Figure 4:
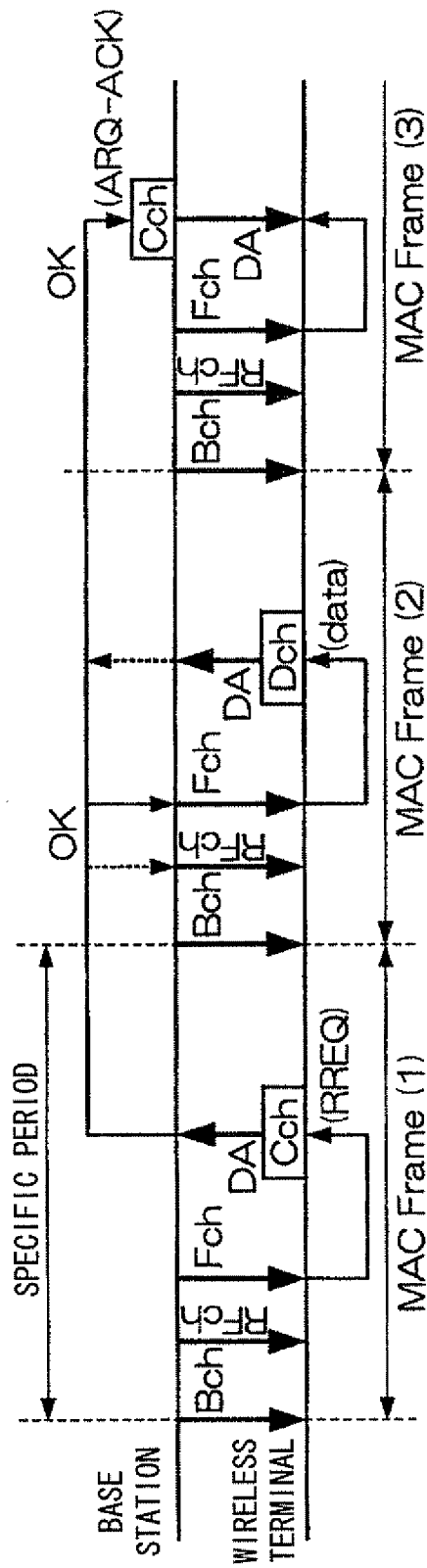
FIG. 4 shows an example of an access sequence when an embodiment of the present invention is applied (when bandwidth assignment for uplink data transmission is performed in Cch for RREQ transmission).
Figure 5:
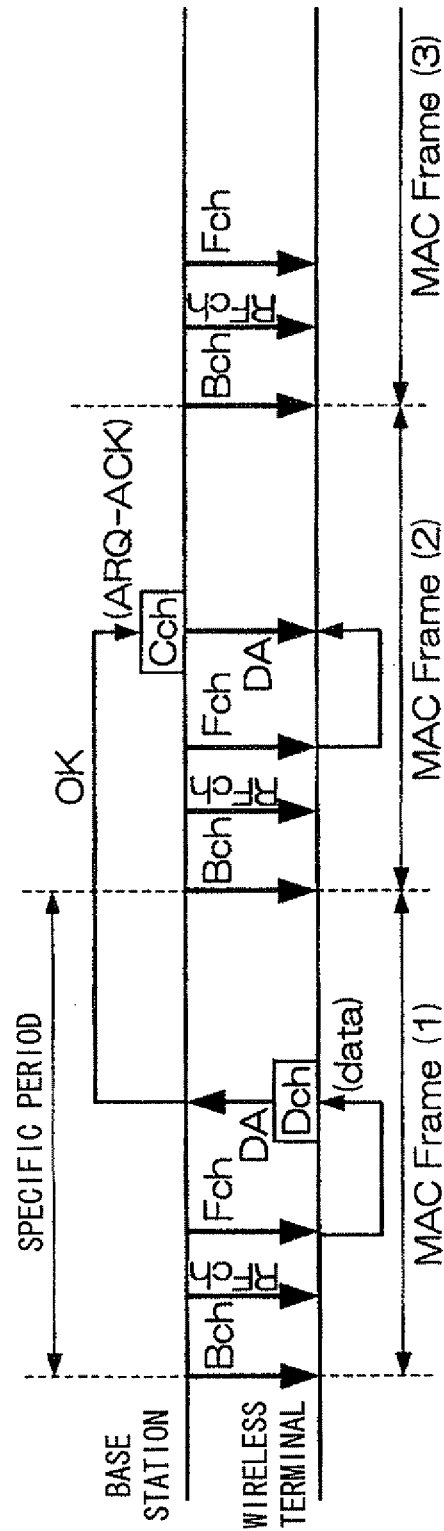
FIG. 5 shows an example of an access sequence when an embodiment of the present invention is applied (when bandwidth assignment for uplink data transmission is performed in data Dch).

FIGS. 4 and 5 show an example of an access sequence in the case where the bandwidth assignment method according to the embodiment of the present invention is applied to the wireless system of FIG. 1. In the present example, for example, the specific period corresponds to one MAC frame (MAC Frame (1)). In FIG. 4, Cch for RREQ transmission is assigned as an assignment bandwidth for uplink (UL) transmission to an uplink demand assignment (DA) area for the wireless terminals 3-1, 3-2 to 3-N or the wireless links 5. In this case, it is possible that an ARQ Cch for Cch for RREQ transmission reception is assigned in a next MAC frame (MAC Frame (2)).

Meanwhile, in FIG. 5, Dch for data transmission is assigned as the uplink transmission assignment bandwidth to an uplink demand assignment (DA) area for relevant wireless terminals 3-1, 3-2 to 3-N or wireless links 5. In FIG. 4, in the specific period, RREQ (bandwidth request) is transmitted using Cch, so that transmission to the random access (RA) area is not performed. Meanwhile, in FIG. 5, the data to transmit is directly transmitted using Dch, so that transmission to the random access (RA) area is not performed. As in the present example, the uplink (UL) transmission assignment bandwidths (channels) in the specific period include the following channels (i) and (ii).

(i) Cch for RREQ transmission, and
(ii) Dch for data transmission

Next, methods in which the base station 2 specifies the period in which a transmission frequency of data to transmit is high, include the following methods (I) to (III).

(I) A method in which the base station 2 specifies the specific period according to an indication from the outside of the base station 2, (II) a method in which the base station 2 determines the specific period based on monitoring/estimation, and (III) a combination of (I) and (II).

Figure 6:
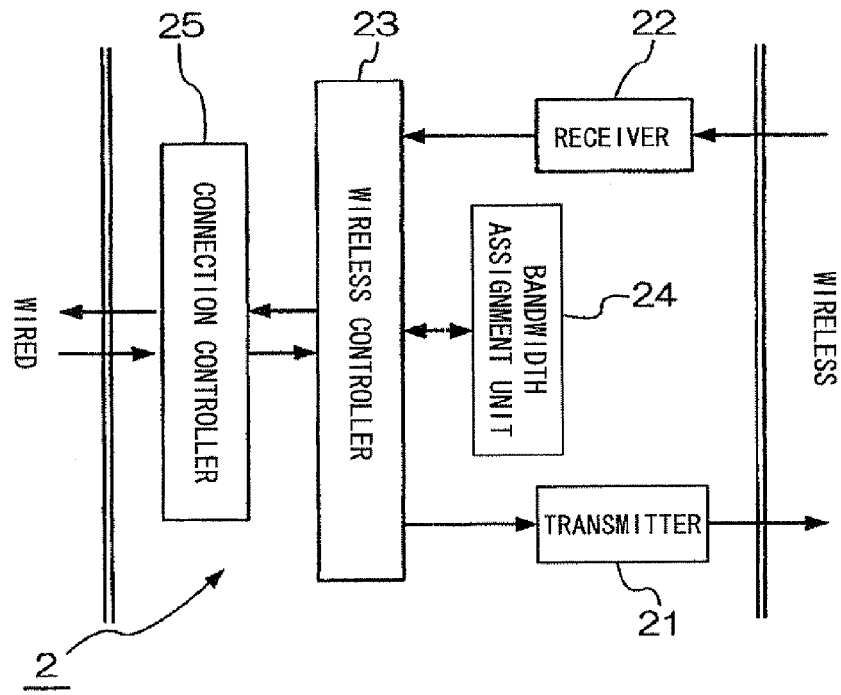
FIG. 6 is a block diagram showing an example of a configuration (basic configuration) of a base station 2 in an embodiment of the present invention.

FIG. 6 shows an example of a basic configuration of the base station 2. As shown in FIG. 6, the base station 2 includes a transmitter 21, a receiver 22, a wireless controller 23, and a bandwidth assignment unit 24, to realize wireless communication. The base station 2 further includes a connection controller 25 to manage communication with a wired side including, for example, the wired network 1 in FIG. 1 and communication of each wireless link 5. The transmitter 21 and the receiver 22, which perform wireless communication with the wireless terminals 3-1, 3-2 to 3-N in FIG. 1, perform transmission and reception in units of a wireless channel. The wireless controller 23 performs generation and disassembly of a wireless frame, control of the transmitter 21 and the receiver 22, and bandwidth management for each wireless link. The bandwidth assignment unit 24 performs scheduling.

In the above-described (I), the base station 2 determines the specific period according to an indication from the wired network 1, e.g., the server 4. For example, the connection controller 25 receives an indication from the wired network 1, specifies the wireless link 5 corresponding to the indication, and notifies the wireless controller 23 of an indication of the initiation/termination of the specific period for the specified wireless link 5.

In this case, a timing when the indication is received from the wired network 1 may be used as an initiation/termination indication of the specific period, and an initiation/termination timing of the specific period included in the indication from the wired network 1 may be used as an initiation/termination indication of the specific period. Further, the timing may be a time or may be information which indicates a time or can be used to calculate the time, such as the frame number of a MAC frame. In the case of the time, the initiation/termination of the specific period is a reception time or an indicated time, and in the case of the frame number, the initiation/termination of the specific period is a received frame or an indicated frame.

Figure 7:
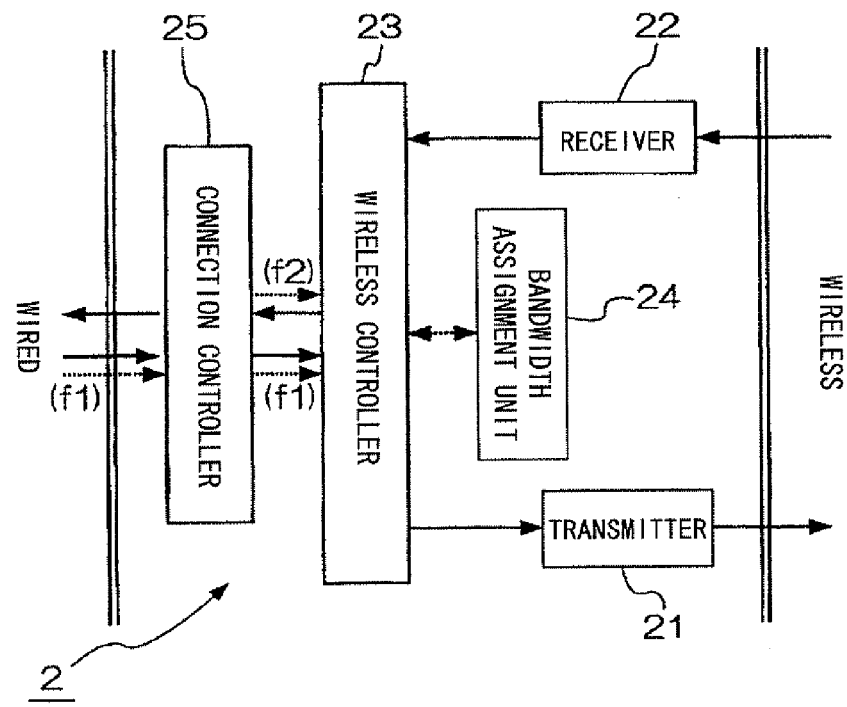
FIG. 7 is a block diagram showing an example of a configuration of a base station 2 (when a specific period is determined according to a notification) in an embodiment of the present invention.

The wireless controller 23 receives the initiation indication from the connection controller 25 to set the initiation of the specific period, and receives the termination indication to set the termination of the specific period. FIG. 7 shows a control flow of the base station 2. FIG. 7 shows a configuration of the base station 2 in FIG. 6. In FIG. 7, an information flow when the specific period is determined by an indication from the connection controller 25 or the wired network 1 is indicated by a dotted line. The dotted line (f1) indicates the present embodiment, and the connection controller 25 indicates the initiation and the termination of the specific period to the wireless controller 23 according to an indication from the server 4 of the wired network 1 (see FIG. 1).

In the above-described (II), in the case of monitoring a data exchange sequence for each wireless link 5, the base station 2 specifies a data exchange sequence performed in the wireless link 5 from a group of known data exchange sequences to determine the specific period. For example, the connection controller 25 receives data from a wireless side or a wired side and identifies first data of the data exchange sequence from a data type in the data to specify the sequence from the known data exchange sequence group, sets a reception timing of the first data for the sequence as the initiation of the specific period and a reception timing of the last data as the termination of the specific period, and indicates the initiation and the termination to the wireless controller 23. The wireless controller 23 receives the initiation indication from the connection controller 25 to set the initiation of the specific period and receives the termination indication to set the termination of the specific period. FIG. 7 shows a control flow of the base station 2. A dotted line (f2) indicates the present embodiment, in which the connection controller 25 indicates the initiation and the termination of the specific period.

Further, the reception timing may be a time or may be information which indicates a time or can be used to calculate the time, such as the frame number of the MAC frame. In the case of the time, the initiation/termination of the specific period is a reception time, and in the case of the frame number, the initiation/termination of the specific period is a received frame.

Figure 8:
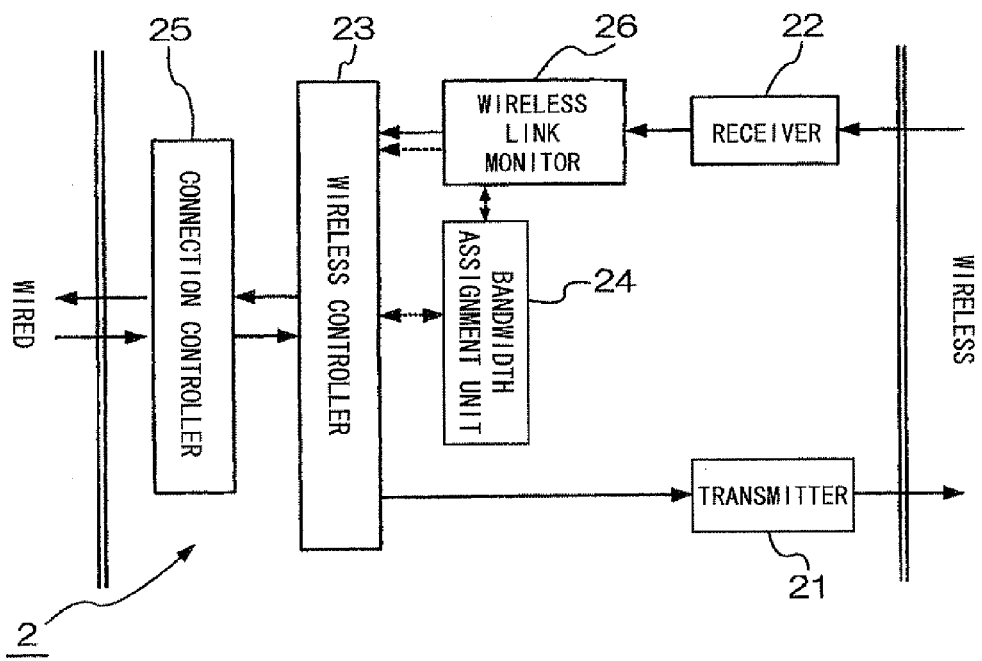
FIG. 8 is a block diagram showing an example of a configuration of a base station 2 (when a specific period is determined by monitoring a wireless link) in an embodiment of the present invention.

Otherwise, in the above-described (II), as shown in FIG. 8, a wireless link monitor 26 is provided between the receiver 22 and the wireless controller 23, so that the base station 2 monitors a communication situation and a bandwidth assignment situation of the wireless link 5, and determines the specific period. That is, the initiation of the specific period corresponds to a bandwidth assignment (e.g., Dch assignment in the present embodiment) timing for the wireless link 5, which is a monitoring object. In this case, Dch to be monitored includes (2-1) only uplink Dch, (2-2) only downlink Dch, or (2-3) both the uplink Dch and the downlink Dch. Meanwhile, the termination of the specific period is determined in the following cases (a) to (c).

(a) A timing when the timer which starts after the initiation is determined is time up (as the termination). In this case, after the detection of the initiation, the timer may restart when assignment of Dch is again performed.

(b) When the base station 2 according to the present embodiment determines the termination of the specific period based on a situation in which a corresponding wireless terminal accesses the uplink transmission bandwidth assigned in the specific period.

(c) At a timing when a bandwidth request in the random access is received.

The conditions described in the above-described (a) to (c) may be used exclusively or in combination.

In the above-described (b), a timing when the number of times of not satisfying the condition reaches a defined number, the condition being that there is no bandwidth request transmission or directly data transmission from a wireless terminal for the assignment bandwidth which was assigned by a base station. In the above-described (b), timing when the bandwidth assignment information for the assignment bandwidth is received may be regarded as the termination.

Further, a bandwidth assignment timing, a timeout timing, the timing when the number of times of not satisfying the condition reaches the defined number, and the timing when the bandwidth assignment information is received may be a time or may be information that indicates a time or can be used to calculate the time, such as the frame number of a MAC frame. In the case of the time, the timings correspond to a time when bandwidth assignment is performed, a timeout time, a time when the number of times of not satisfying the condition reaches the defined number, and a reception time, respectively. In the case of the frame number, the timings correspond to a frame in which the bandwidth assignment is performed, a timeout frame, a frame in which the number of times of not satisfying the condition reaches the defined number, or a reception frame, respectively.

Figure 9:
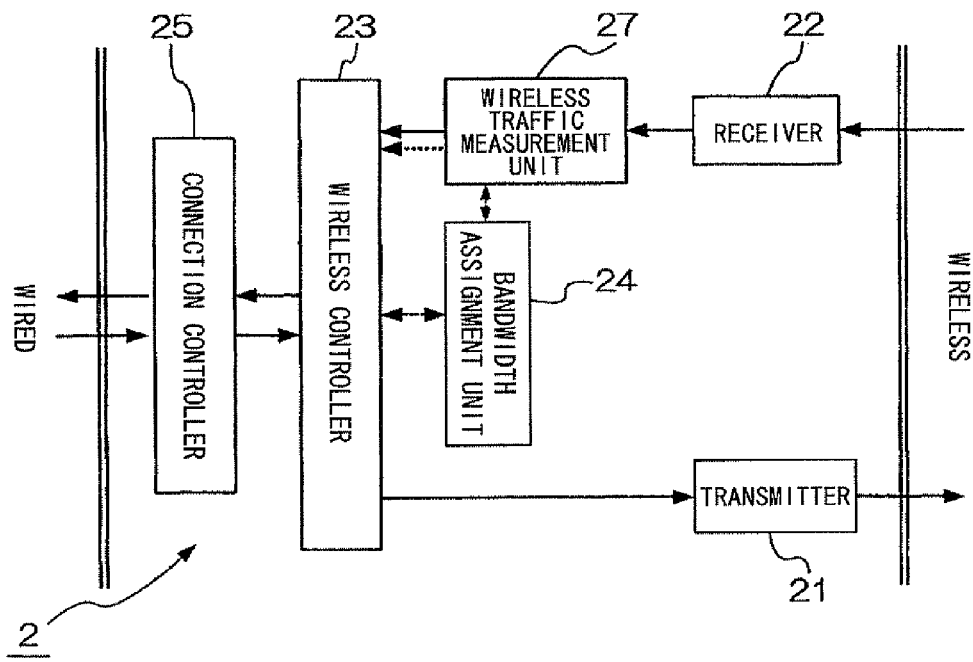
FIG. 9 is a block diagram showing an example of a configuration of a base station 2 (when a specific period is determined by traffic measurement of a wireless link) in an embodiment of the present invention.

In the above-described (II), a wireless traffic measurement unit 27 may be placed between the receiver 22 and the wireless controller 23 as shown in FIG. 9, and the base station 2 may measure traffic of uplink (Dch) for data transmission of the wireless link 5 and estimate the specific period based on the measurement result. In this case, the specific period is determined from the following measurement information.

(3-1) Generation information of data to transmit, and
(3-2) reception information of data to transmit.

In the case of (3-1), the wireless terminals 3-1, 3-2, ..., 3-N transmit data to transmit with the data generation information. Upon receipt of the data to transmit, the base station 2 takes a difference with previous data generation information to calculate a data generation interval. Upon receipt of data (Dch), the base station 2 determines a specific period for next data based on a certain interval or generation intervals measured for the number of data predefined. In this case, the initiation of the specific period corresponds to generation information of last received data plus a minimum/maximum generation interval measured, and the termination of the specific period corresponds to generation information of last received data plus a maximum generation interval.

In the case of (3-2), the base station 2 stores data reception information and takes a difference with previous data reception information to calculate a reception interval of data to transmit in the base station 2. Upon receipt of data (Dch), the base station 2 determines a specific period for next data based on a certain interval or reception intervals measured for the number of data predefined. In this case, the initiation of the specific period corresponds to reception information for last received data plus a minimum/maximum reception interval measured, and the termination of the specific period corresponds to reception information for last received data plus a maximum reception interval.

The generation information and the reception information may be time information or may be information which indicates a time or can be used to calculate the time, such as frame number of a MAC frame (constant length).

The generation information and the reception information, when defined as time, are a generation time and a reception time, respectively, and when defined as frames, are a generation frame and a reception frame, respectively.

The above-described (III) is a combination of the above-described (I) and (II). For example, the above-described (I) is applied for the initiation of the specific period and the termination is determined by monitoring of the above-described (II). Alternatively, the initiation is determined by monitoring of (II), and (I) is applied for the termination. Thus, the initiation time and the termination time are set by a combination of (I) and (II).

Next, the bandwidth assignment method in the specific period set by the wireless controller 23 is performed by the bandwidth assignment unit 24 at the following timing (A) or (B).

(A) A defined timing, and
(B) a timing satisfying a defined condition.

(A) includes, for example, every frame, every number of frames predefined, and the number of frames predefined after the initiation of the specific period.

(B) applies (A) when the defined condition is satisfied. For example, the defined condition is that there is data assignment of downlink (data transmission from the base station 2 to the wireless terminals 3-1, 3-2 to 3-N) for the wireless terminals 3-1, 3-2 to 3-N or the wireless links 5, and that there is an indication from the connection controller 25.

Hereinafter, a wireless system according to first to third embodiments of the present invention will be described.

Figure 10:
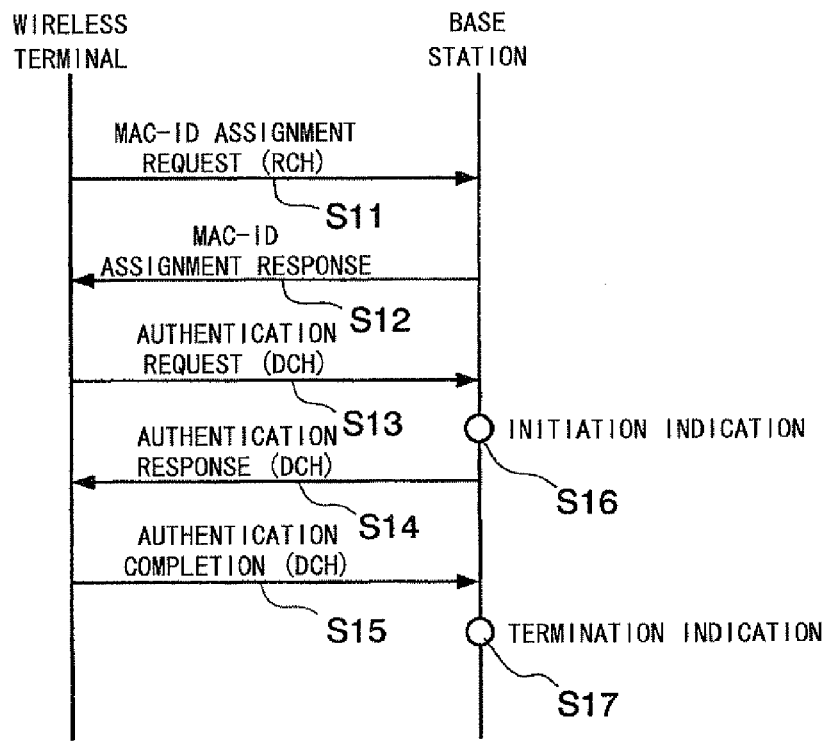
FIG. 10 shows an example of a sequence in an authentication process.

First, a common process between the first embodiment and the second embodiment will be described with reference to FIG. 10. FIG. 10 shows an example of an authentication processing sequence in the first embodiment and the second embodiment. In the present example, the wireless terminals 3-1, 3-2 to 3-N are synchronized to the base station 2 and perform an authentication process in order to initiate wireless communication.

First, the wireless terminals 3-1, 3-2 to 3-N transmit, by random access, a MAC-ID assignment request to the base station 2 in order to acquire a MAC-ID, which is an ID for the base station 2 to specify a wireless terminal 2, in the wireless period (step S11). The wireless terminal 2 receives a MAC-ID assignment response from the base station 2 (step S12).

The wireless terminal performs an authentication processing sequence (authentication request, authentication response, and authentication completion) that is a known data exchange sequence. That is, the wireless terminals 3-1, 3-2 to 3-N transmit an authentication request to the base station 2 (step S13). The wireless terminals 3-1, 3-2 to 3-N receive an authentication response from the base station 2 (step S14). The wireless terminals 3-1, 3-2 to 3-N transmit authentication completion to the base station 2 (step S15). The present process is performed by the connection controller 25 and the exchanged data is sequential.

Bandwidth assignment for uplink (UL) transmission is performed for the present sequence. Determination of the specific period may be based on monitoring of the data exchange sequence for the wireless link 5 (corresponding to FIG. 7) and based on monitoring of a bandwidth assignment situation for the wireless link 5 (corresponding to FIG. 8).

When the determination of the specific period is based on monitoring of the data exchange sequence in the above-described (II), as shown in FIG. 10, the connection controller 25 in FIG. 7 receives an authentication request, which is first data for the authentication processing sequence, and then notifies the wireless controller 23 of an initiation indication (step S16). The connection controller 25 receives an authentication completion, which is last data for the authentication processing sequence, and then notifies the wireless controller 23 of termination indication (step S17). In this case, the wireless controller 23 regards the initiation indication and the termination indication as the initiation and the termination of the specific period. Meanwhile, when the determination of the specific period is based on monitoring of the bandwidth assignment situation of the wireless link 5 in the above-described (II), the wireless link 5 performing the authentication process is monitored and the initiation of Dch bandwidth assignment for the wireless link 5 is regarded as the initiation of the specific period. Further, the base station 2 counts the number of non-access channels assigned in the specific period for the wireless link 5, and when the number of non-access channels reaches a defined value, it is regarded as communication termination of the wireless link 5, which indicates the termination of the specific period.

For the determination of the specific period, both of the two cases can be applied to the first and second embodiments.

First Embodiment

In the present embodiment, an example in which the termination time of the specific period has not been determined at the time of initiation of the specific period (a method other than a method of determining a specific period based on estimation is used), the specific period is set for the authentication processing sequence, and every frame assignment is performed in the specific period will be described.

In the present embodiment, an assignment process in which an uplink (UL) transmission bandwidth assignment in the above-described specific period is performed for every frame in the above-described (A), in which an uplink (UL) bandwidth assignment is Cch for RREQ (bandwidth request) transmission in the above-described (i), and in which one Cch is assigned for every frame will be described.

Figure 11:
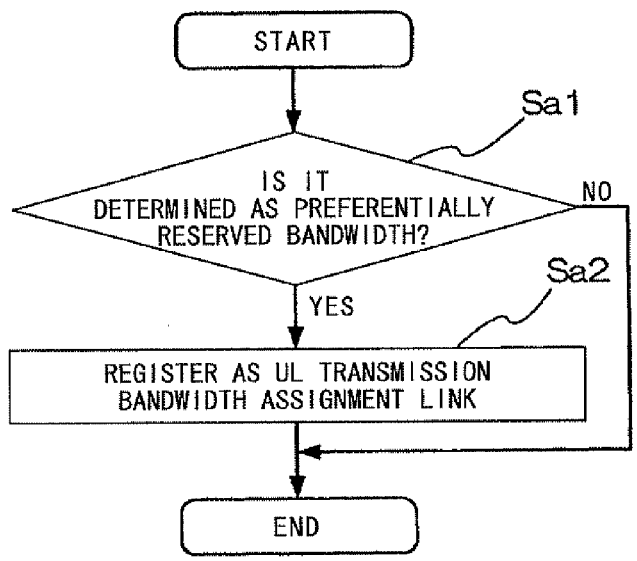
FIG. 11 is a flowchart of a registration determination process for a bandwidth assignment link for uplink transmission according to an embodiment of the present invention.

FIG. 11 illustrates a registration determination process for an uplink (UL) transmission bandwidth assignment link. A determination is made as to whether a wireless link 5 of which the specific period has been initiated can be registered as the uplink (UL) transmission bandwidth assignment link (step Sa1).

If the wireless link 5 can be registered, a Cch for RREQ transmission bandwidth is assigned to the wireless link 5 until the specific period is terminated (step Sa2). In this case, the Cch for RREQ transmission bandwidth is regarded as a preferentially reserved bandwidth. Here, the preferentially reserved bandwidth is a necessarily reserved bandwidth.

In the registration determination process in step Sa1, a total preferentially reserved bandwidth value (obtained by adding a Cch for RREQ transmission bandwidth for the wireless link 5 to a total preferentially reserved bandwidth for a previously registered link) is compared with a maximum value (a value set in advance). When the total preferentially reserved bandwidth value is equal to or smaller than the maximum value, the RREQ bandwidth is determined as the preferentially reserved bandwidth and the link is registered as the uplink (UL) transmission bandwidth assignment link in step Sa2. When the bandwidth assignment unit 24 performs scheduling, Cch for RREQ transmission is assigned to all links registered as the uplink (UL) transmission bandwidth assignment link. When the total preferentially reserved bandwidth value exceeds the maximum value, the added Cch bandwidth is subtracted from the total preferentially reserved bandwidth value to return the value before comparison.

Figure 12:
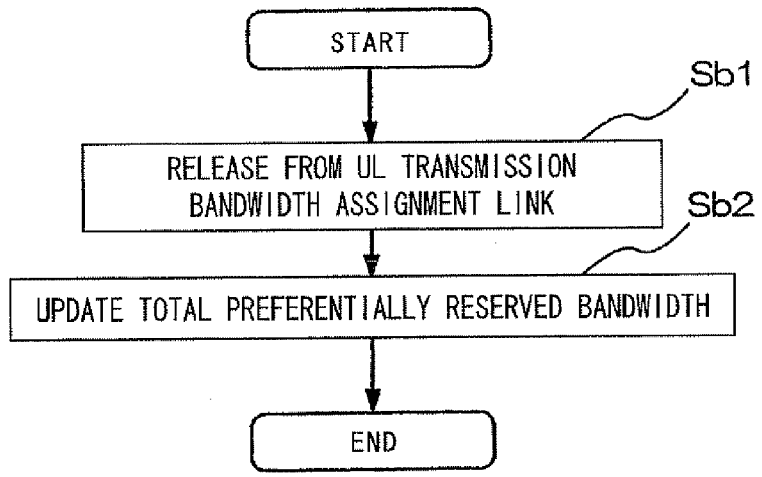
FIG. 12 is a flowchart of a process of releasing a bandwidth assignment link for uplink transmission according to an embodiment of the present invention.

FIG. 12 shows a process of releasing the uplink (UL) transmission bandwidth assignment link. The present process is performed at the time of the termination of the specific period to release a relevant link from the uplink (UL) transmission bandwidth assignment link (step Sb1). The RREQ bandwidth for the relevant link is subtracted from the total preferentially reserved bandwidth value to update the total preferentially reserved bandwidth value (step Sb2).

Second Embodiment

In the present embodiment, an assignment example in which the termination time of the specific period has not been determined at the time of the initiation of the specific period (other than the method of determining a specific period based on estimation), in which the specific period is set for the authentication processing sequence, and in which there is an assignment condition in the specific period will be described.

In the present embodiment, an example in which the uplink (UL) transmission bandwidth assignment method in a specific period satisfies the assignment condition in the above-described (B) will be described. The time of downlink Dch transmission is used as the assignment condition, and the UL transmission bandwidth is assigned only once in the same frame and after thereof. In FIG. 10, this example corresponds to a transmission timing (frame) of authentication response message. Further, in this case, Dch for data transmission in the above-described (ii) is performed as the uplink (UL) bandwidth assignment.

Although, in the present example, the assignment bandwidth is a Dch for data transmission, not a Cch for RREQ transmission, the present invention is not limited thereto. For example, Dch can be directly assigned when an exchanged message has a constant length and is sequential as in the authentication processing sequence. A wireless link of which the specific period has been initiated is registered as an uplink (UL) transmission bandwidth assignment link. Further, the wireless link of which the specific period has been terminated is released from the uplink (UL) transmission bandwidth assignment link.

Figure 13:
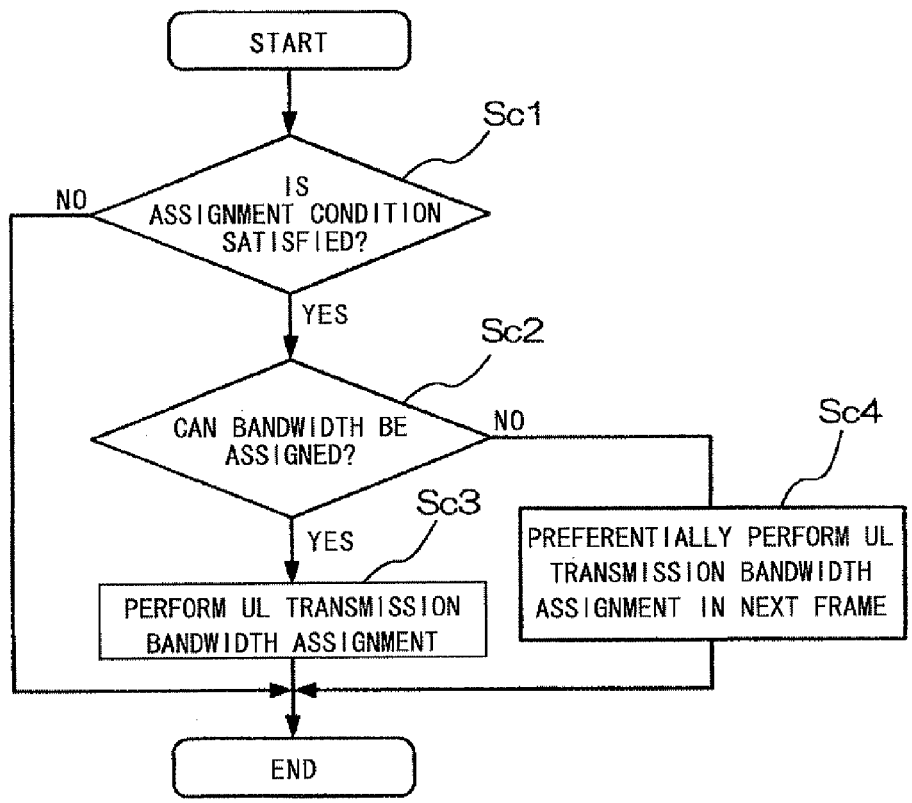
FIG. 13 is a flowchart of a bandwidth assignment process for uplink transmission according to an embodiment of the present invention.

When the bandwidth assignment unit 24 initiates scheduling, a preferentially reserved bandwidth is assigned as in the first embodiment, and an assignable bandwidth (a remaining bandwidth) is calculated through subtraction of the assigned bandwidth. Next, an uplink (UL) transmission bandwidth assignment process shown in FIG. 13 is performed on all links of the uplink (UL) transmission bandwidth assignment link. First, a determination is made as to whether an assignment condition is satisfied (step Sc1). When the assignment condition is satisfied, the remaining bandwidth is compared with the uplink (UL) transmission assignment bandwidth to determine whether the uplink (UL) transmission bandwidth can be reserved (step Sc2). When an uplink (UL) transmission assignment bandwidth value is equal to or smaller than the remaining bandwidth value, the uplink (UL) transmission bandwidth can be assigned. As an uplink (UL) transmission bandwidth assignment process, a Dch for data transmission is assigned to a corresponding wireless link 5 (step Sc3). In this case, the assignment bandwidth value is subtracted from the remaining bandwidth value to update the remaining bandwidth.

Meanwhile, when the assignment condition is not satisfied ("No" in step Sc1), the UL transmission bandwidth assignment process for the wireless link is not performed.

Meanwhile, when the assignment condition is satisfied ("Yes" in step Sc1), but assignment in the present scheduling frame cannot be performed ("No" in step Sc2), uplink (UL) transmission bandwidth assignment is preferentially performed in a next frame (step Sc4). In the present process, an assignment bandwidth for the uplink (UL) transmission bandwidth assignment link satisfying the assignment condition is reserved as a preferentially reserved bandwidth (described in the first embodiment) in the next frame, and the assignment is definitely performed in the next frame. Upon the assignment completion, the assignment bandwidth is released from the preferentially reserved bandwidth.

Although the uplink (UL) transmission assignment bandwidth in the present example is the Dch for data transmission, it may be a Cch for RREQ transmission.

Third Embodiment

Figure 3:
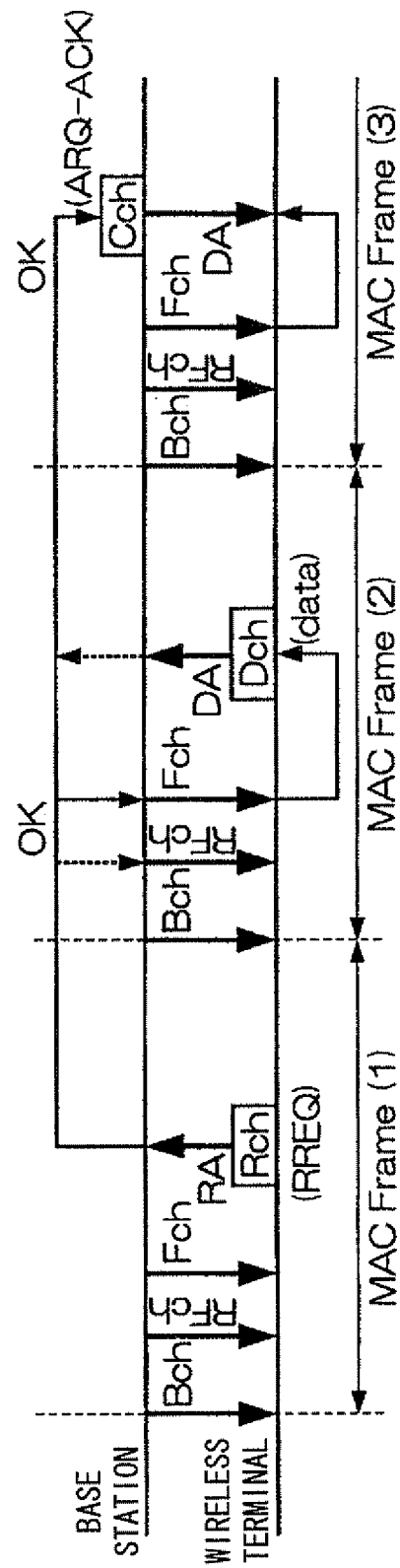
FIG. 3 shows an example of a data transmission sequence for uplink data in a conventional technique.

In the present embodiment, an application to uplink (UL) transmission of data (corresponding to "data" in FIG. 3) during communication of the wireless link 5 in which the termination time of the specific period has been determined at the time of the initiation of the specific period (a method of determining the specific period based on estimation is used) will be described. A determination of the specific period is performed based on traffic estimation using the generation information in the above-described (II). When data is received, a difference with generation information for previous data is taken to calculate a data generation interval. A generation period of next data is predicted from the measured generation interval and the predicted period is used as the specific period. The generation interval is calculated by the wireless terminals 3-1, 3-2 to 3-N transmitting data with generation information and the base station 2 retaining the data generation interval during a certain period or by a certain data number. The initiation of the specific period corresponds to generation information of the last received data plus a minimum generation interval. Further, the termination of the specific period corresponds to the generation information of the last received data plus a maximum generation interval.

For the specific period in the present embodiment, a threshold that is an upper limit value of the specific period may be set, and uplink (UL) transmission bandwidth assignment, which will be described below, may be performed on the wireless link 5 corresponding to the threshold or smaller. Accordingly, it is effective to preferentially perform the bandwidth assignment for uplink (UL) transmission of data with a small generation interval deviation, i.e., a high periodicity.

Figure 14:
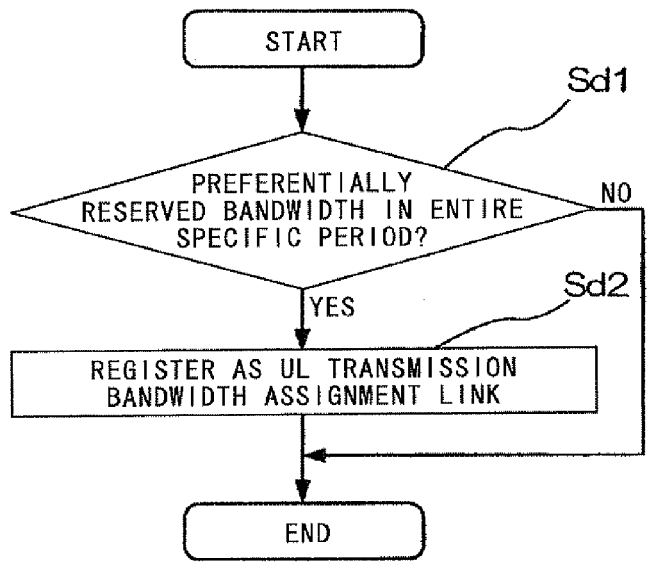
FIG. 14 is a flowchart of a registration determination process for a bandwidth assignment link for uplink transmission according to an embodiment of the present invention.

In the present embodiment, an assignment process in the case where one Cch is assigned for every frame, in which the uplink (UL) transmission bandwidth assignment in the specific period is performed for every frame in the above-described (A) and the assignment bandwidth for the uplink (UL) transmission is a Cch for RREQ transmission of the above-described (i), will be described. FIG. 14 shows a registration determination process for the uplink (UL) transmission bandwidth assignment link. First, a determination is made as to whether the wireless link 5 of which the specific period has been initiated can be registered as the uplink (UL) transmission bandwidth assignment link (step Sd1). When the wireless link 5 can be registered, a Cch for RREQ transmission bandwidth is assigned to the wireless link in all frames in the specific period. The Cch for RREQ transmission bandwidth is regarded as the preferentially reserved bandwidth. In the present registration determination process, a determination is made as to whether the preferentially reserved bandwidth can be reserved in all the frames in the specific period. The determination for the preferentially reserved bandwidth can be made using the method described in the first embodiment. When the RREQ bandwidth can be determined as the preferentially reserved bandwidth in all the frames, the link is registered as the uplink (UL) transmission bandwidth assignment link (step Sd2). Upon scheduling in the bandwidth assignment unit 24, a Cch for RREQ transmission is assigned to all links registered as the uplink (UL) transmission bandwidth assignment link.

Figure 15:
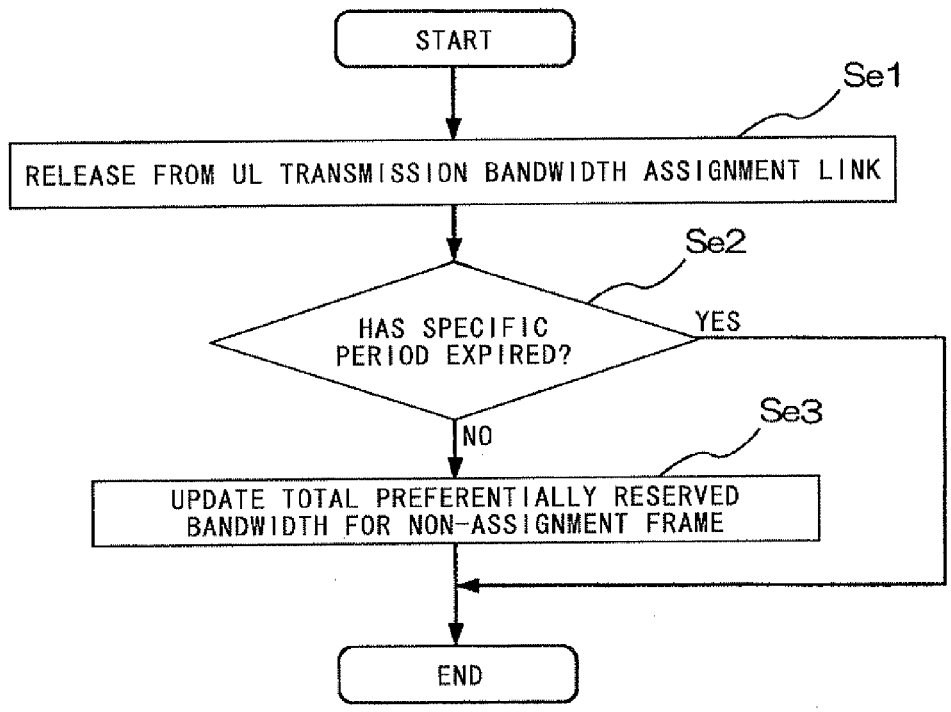
FIG. 15 is a flowchart of a process of releasing a bandwidth assignment link uplink transmission according to an embodiment of the present invention.

FIG. 15 shows a process of releasing an uplink (UL) transmission bandwidth assignment link. The present process is performed when the specific period expires or when the specific period is terminated halfway. Upon uplink reception, the link is released from the uplink (UL) transmission bandwidth assignment link (step Se1).

A determination is made as to whether the specific period has expired (step Se2).

When the specific period has expired ("Yes" in step Se2), the process shown in FIG. 15 ends.

If the specific period is terminated halfway ("No" in step Se2), i.e., when a bandwidth request is received in random access or in uplink transmission bandwidth assignment, an RREQ bandwidth for the link is subtracted from a total preferentially reserved bandwidth value to update a total preferentially reserved bandwidth value for a non-assignment frame (step Se3).

As described above, the above embodiment is used with dynamic slot (bandwidth) assignment (DSA) in TDMA/TDD, which is a communication method in the case where, for example, a plurality of wireless terminals 3-1, 3-2 to 3-N share a wireless line consisting of a plurality of wireless links 5. As shown in FIG. 2, the demand assignment period and the random access period are set in the uplink period of the MAC frame. The wireless terminals 3-1, 3-2 to 3-N transmit the bandwidth assignment request to the base station 2 in the random access period. When the transmission is successfully performed and the bandwidth in the demand assignment period is assigned from the base station 2, the wireless terminals 3-1, 3-2 to 3-N transmit data to transmit to the base station 2 using the assignment bandwidth. When the transmission is not successfully performed, the wireless terminals 3-1, 3-2 to 3-N iteratively retransmit the bandwidth assignment request after the back-off time lapses. A period in which a frequency of uplink data transmission is high is analyzed and determined for each of the wireless terminals 3-1, 3-2 to 3-N or each wireless link 5. In the specific period, the base station 2 assigns the demand assignment bandwidth to the wireless terminals 3-1, 3-2 to 3-N or the wireless links 5. That is, the base station 2 specifies the period in which the uplink data transmission frequency is high (the specific period) for each of the wireless terminals 3-1, 3-2 to 3-N or the wireless links 5. In this period, the uplink data transmission bandwidth is assigned to the wireless terminals 3-1, 3-2 to 3-N or the wireless links 5. Here, the specific period may be determined, for example, using a method based on an external indication or a method by which the base station 2 monitors a bandwidth assignment situation and performs traffic estimation. Accordingly, the base station 2 assigns the uplink (UL) transmission bandwidth in advance, such that the wireless terminals 3-1, 3-2 to 3-N need not transmit the bandwidth assignment request in the random access period. Accordingly, it is possible to reduce random access (RA) traffic. That is, with the embodiment of the present invention, it is possible to suppress data collision in the random access period and improve a throughput even in a period in which traffic is concentrated.

Although the respective embodiments have been described based on the frame configuration of a conventional technique shown in FIG. 2, the present invention is not limited thereto. For example, the present invention may also be applied for a frame in which an order of Bch, RFch, Fch and so on is changed. Further, the respective configurations (the respective blocks as shown in FIGS. 6 to 9) of the embodiments of the present invention can be realized by a combination of a computer and its peripheral devices and a program executed by the computer, such that a change such as division and integration of the respective configurations can be properly performed.

INDUSTRIAL APPLICABILITY

The present invention can be applied to a wireless communication method, a wireless communication system, a base station, a terminal station and so on that can reduce random access traffic, thereby reducing overhead resulting from collision and enhancing a throughput property and a delay property between the base station and a wireless terminal connected with the base station by a wireless line.

The invention claimed is:

1. A wireless communication method in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the wireless communication method comprising:
   identifying, by the base station, first data of a data exchange sequence from a data type in the data;
   specifying, by the base station, a predetermined sequence from known data exchange sequence group;
   setting, by the base station, a first reception timing of the first data for the predetermined sequence as an initiation of a specific period in which a frequency of data transmission is high, the specific period being specified for each terminal station or each wireless link between the terminal station and the base station;
   setting, by the base station, a second reception timing of last data as a termination of the specific period;
   performing, by the base station, bandwidth assignment for each terminal station or each wireless link even when the base station does not receive a bandwidth request in the random access from the terminal station in the demand assignment period present in the specific period; and
   transmitting, by the terminal station, the bandwidth request information or the data to transmit in the bandwidth assigned by the base station.

2. A wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the wireless communication system comprising:

the terminal station; and
the base station,
wherein the base station is configured to identify first data of a data exchange sequence from a data type in the data, specify a predetermined sequence from known data exchange sequence group, set a first reception timing of the first data for the predetermined sequence as an initiation of a specific period in which a frequency of data transmission is high, the specific period being specified for each terminal station or each wireless link between the terminal station and the base station, set a second reception timing of last data as a termination of the specific period, and perform bandwidth assignment for each terminal station or each wireless link even when the base station does not receive a bandwidth request in the random access from the terminal station in the demand assignment period present in the specific period, and
the terminal station is configured to transmit the bandwidth request information or the data to transmit in the bandwidth assigned by the base station.

3. A base station in a wireless communication system in which a plurality of terminal stations are connected to the base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the base station comprising:
a bandwidth assignment unit configured to identify first data of a data exchange sequence from a data type in the data, specify a predetermined sequence from known data exchange sequence group, set a first reception timing of the first data for the predetermined sequence as an initiation of a specific period in which a frequency of data transmission is high, the specific period being specified for each terminal station or each wireless link between the terminal station and the base station, set a second reception timing of last data as a termination of the specific period, and perform bandwidth assignment for each terminal station or each wireless link even when the base station does not receive a bandwidth request in random access from the terminal station in the demand assignment period present in the specific period; and
a receiver configured to receive at least one of the bandwidth request information and the data to transmit in the assigned bandwidth from the terminal station.

4. A terminal station in a wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, the terminal comprising:

a transmitter configured to transmit at least one of the bandwidth request information and the data to transmit in the bandwidth assigned by the base station,
wherein the base station identifies first data of a data exchange sequence from a data type in the data, specifies a predetermined sequence from known data exchange sequence group, sets a first reception timing of the first data for the predetermined sequence as an initiation of a specific period in which a frequency of data transmission is high, the specific period being specified for each terminal station or each wireless link between the terminal station and the base station, sets a second reception timing of last data as a termination of the specific period, and performs bandwidth assignment for each terminal station or each wireless link even when the base station does not receive a bandwidth request in the random access from the terminal station in the demand assignment period present in the specific period.

5. A wireless communication method in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the wireless communication method comprising:

monitoring, by the base station, a communication situation and a bandwidth assignment situation of a wireless link;
setting, by the base station, a bandwidth assignment timing for the wireless link being a monitoring object as an initiation of a specific period in which a frequency of data transmission is high, the specific period being specified for each terminal station or each wireless link between the terminal station and the base station;
setting, by the base station, a termination of the specific period based on any one of first, second and third cases, wherein, the first case is that a first timing when a timer is time up is set as the termination of the specific period, the second case is that the termination of the specific period is set based on a situation in which the terminal station accesses an assigned uplink transmission bandwidth, and the third case is that a second timing when a bandwidth request in the random access is received is set as the termination of the specific period;
performing, by the base station, bandwidth assignment for each terminal station or each wireless link even when the base station does not receive a bandwidth request in the random access from the terminal station in the demand assignment period present in the specific period; and
transmitting, by the terminal station, the bandwidth request information or the data to transmit in the bandwidth assigned by the base station.

6. A wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the wireless communication system comprising:

the terminal station; and the base station, wherein the base station is configured to monitor a communication situation and a bandwidth assignment situation of a wireless link, set a bandwidth assignment timing for the wireless link being a monitoring object as an initiation of a specific period in which a frequency of data transmission is high, the specific period being specified for each terminal station or each wireless link between the terminal station and the base station, set a termination of the specific period based on any one of first, second and third cases, wherein, the first case is that a first timing when a timer is time up is set as the termination of the specific period, the second case is that the termination of the specific period is set based on a situation in which the terminal station accesses an assigned uplink transmission bandwidth, and the third case is that a second timing when a bandwidth request in the random access is received is set as the termination of the specific period, and perform bandwidth assignment for each terminal station or each wireless link even when the base station does not receive a bandwidth request in the random access from the terminal station in the demand assignment period present in the specific period; and the terminal station is configured to transmit the bandwidth request information or the data to transmit in the bandwidth assigned by the base station.

7. A base station in a wireless communication system in which a plurality of terminal stations are connected to the base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from a terminal station among the plurality of the terminal stations, and the terminal station transmitting, by random access, the bandwidth request information in the random access period after a back-off time lapses when data to transmit is generated, and transmitting the data to transmit using a bandwidth assigned from the base station when the transmission is successfully performed, the base station comprising:

a bandwidth assignment unit configured to monitor a communication situation and a bandwidth assignment situation of a wireless link, set a bandwidth assignment timing for the wireless link being a monitoring object as an initiation of a specific period in which a frequency of data transmission is high, the specific period being specified for each terminal station or each wireless link between the terminal station and the base station, set a termination of the specific period based on any one of first, second and third cases, wherein, the first case is that a first timing when a timer is time up is set as the termination of the specific period, the second case is that the termination of the specific period is set based on a situation in which the terminal station accesses an assigned uplink transmission bandwidth, and the third case is that a second timing when a bandwidth request in the random access is received is set as the termination of the specific period, and perform bandwidth assignment for each terminal station or each wireless link even when the base station does not receive a bandwidth request in the random access from the terminal station in the demand assignment period present in the specific period; and a receiver configured to receiver, from the terminal station, the bandwidth request information or the data to transmit in the bandwidth assigned by the base station.

8. A terminal station in a wireless communication system in which a plurality of terminal stations are connected with a base station by a common wireless line, the base station managing a bandwidth for bandwidth assignment in an uplink communication bandwidth of a wireless frame as a demand assignment period and a remaining bandwidth as a random access period, and assigning a requested uplink communication bandwidth to the demand assignment period according to bandwidth request information from the terminal station, and the terminal station transmitting, by random access, the bandwidth request information in the random access period after a back-off time lapses when data to transmit is generated, and transmitting the data to transmit using a bandwidth assigned from the base station when the transmission is successfully performed, the terminal comprising:

a transmitter configured to transmit the bandwidth request information or the data to transmit in the bandwidth assigned by the base station, wherein the base station monitors a communication situation and a bandwidth assignment situation of a wireless link, sets a bandwidth assignment timing for the wireless link being a monitoring object as an initiation of a specific period in which a frequency of data transmission is high, the specific period being specified for each terminal station or each wireless link between the terminal station and the base station, sets a termination of the specific period based on any one of first, second and third cases, wherein, the first case is that a first timing when a timer is time up is set as the termination of the specific period, the second case is that the termination of the specific period is set based on a situation in which the terminal station accesses an assigned uplink transmission bandwidth, and the third case is that a second timing when a bandwidth request in the random access is received is set as the termination of the specific period, and performs bandwidth assignment for each terminal station or each wireless link even when the base station does not receive a bandwidth request in the random access from the terminal station in the demand assignment period present in the specific period.

* * * * *